A. FELTON.
Grain Mill.
No. 347.
Reissued Jan'y 29, 1856.
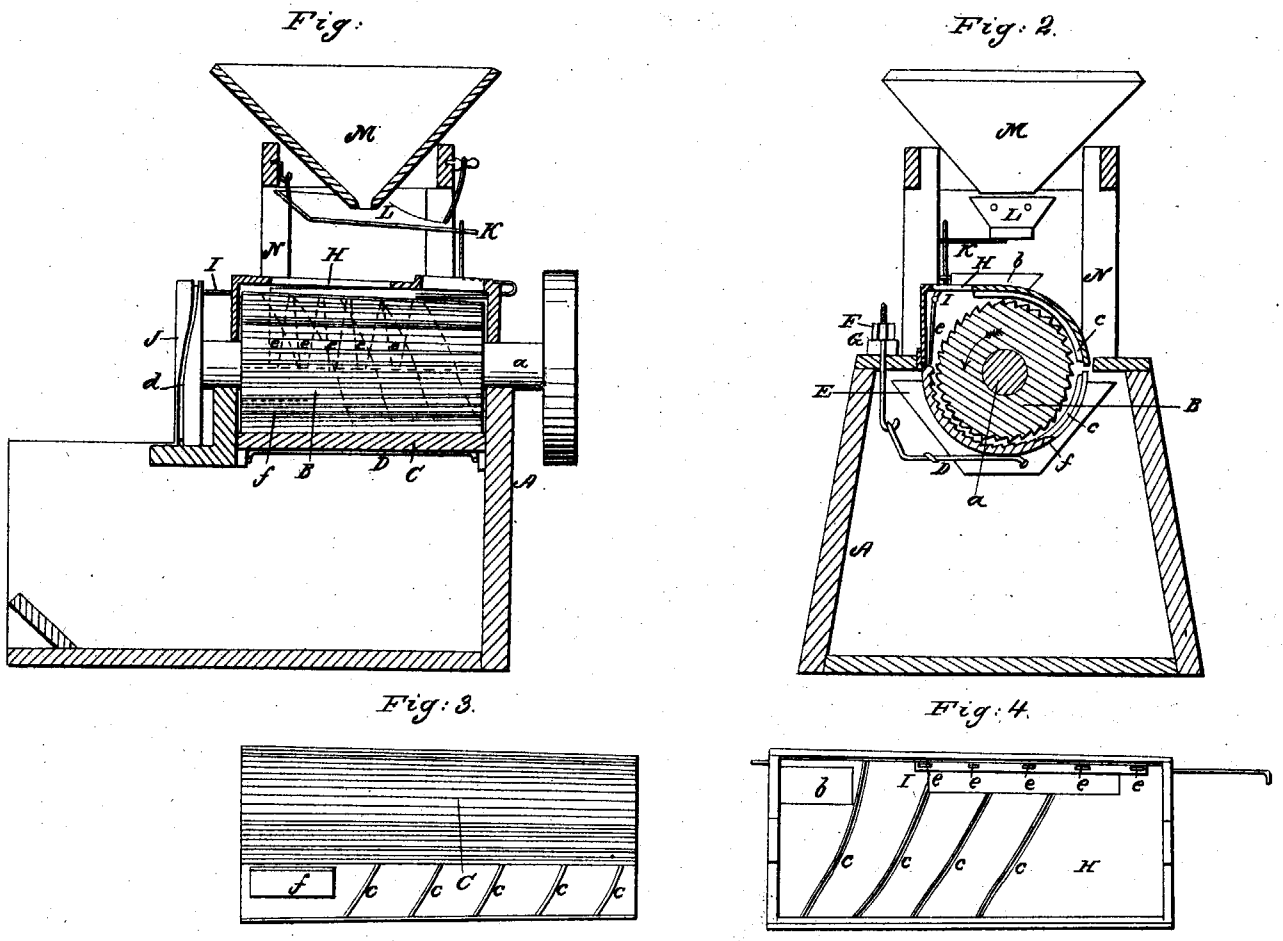
N. PETERS, Photo-Lithographer, Washington, D. C.

UNITED STATES PATENT OFFICE.

AMORY FELTON, OF TROY, NEW YORK.

IMPROVEMENT IN GRINDING-MILLS.

Specification forming part of Letters Patent No. 12,181 dated January 2, 1855; Reissue No. 347, dated January 29, 1856.

*To all whom it may concern:*

Be it known that I, AMORY FELTON, of Troy, in the county of Rensselaer and State of New York, have invented certain new and useful Improvements in Grinding-Mills; and I do hereby declare the following to be a full, clear, and exact description of the same, reference being had to the accompanying drawings, making a part thereof, in which—

Figure 1 represents a longitudinal vertical section through the mill centrally, the cylinder being represented in full, or as uncut. Fig. 2 represents a vertical transverse section, the hopper and shoe not being cut. Fig. 3 represents a detached plan or top view of the concave; and Fig. 4 represents an internal view of the cap which covers the cylinder, said cap being inverted.

Similar letters of reference in the several figures denote like parts in all.

The nature of my invention relates, first, to combining with the cylinder and concave a peculiarly-contrived cap with spiral ribs or projections on its under side, which advance the ground material along the cylinder and prevent its choking or clogging at any one point; and, secondly, to the reciprocating teeth for agitating the grain, or partially-ground material, to cause it to more readily pass in between the cylinder and concave.

To enable others skilled in the art to make and use my invention, I will proceed to describe the same with reference to the drawings.

A, Figs. 1 and 2, represents a box or case upon the upper part of which the axis *a* of the cylinder B has its bearings, a portion of the cylinder—say about one-half—being within the box or case. The periphery of the cylinder B is corrugated or has teeth upon it, one side of which is radial with the cylinder, the opposite side being oblique or inclined, but not quite tangential with the periphery of the cylinder, as shown in Fig. 2. The cylinder is made of cast-iron, chilled cast-iron being preferable; or it can be made of stone, or stone and iron combined, or of any other material.

Directly underneath the cylinder B there is a concave, C, of semicircular form, (see Fig. 2,) and constructed of the same material as the cylinder. The concave is provided with teeth on about two-thirds of its surface, the said teeth being precisely similar to the teeth of the cylinder. The ends of the concave rest in semicircular grooves or recesses at the inner sides of the box or case, and directly underneath the concave there is a frame, D, the ends of which fit in the inner sides of the box or case. To the outer edge of this frame an upright rod, E, is attached, having a screw-thread cut on its upper end, on which a nut, F, is fitted. The upper end of the screw-thread passes through the center of a spring, G, the nut F being on the upper side of the spring, as shown in Fig. 2.

H is a cap which is fitted over the top of the cylinder B. One side of the cap is curved and corresponds to a portion of the periphery of the cylinder. (See Fig. 2.) At one end of the cap there is an opening, *b*. The under surface of the cap is provided with spiral flanges *c*, (see Fig. 4,) and the portion of the concave *c* which is not provided with teeth is also provided with spiral flanges *c*, (see Fig. 3,) which, when the cap is placed over the cylinder, coincide with the flanges of the cap H. (See red dotted lines, Fig. 1.)

I is a rod which passes longitudinally through the cap H at one side. (See Figs. 1, 2, and 4.) One end of this rod is bent and fits in an irregular groove, *d*, cut in the periphery of a pulley, J, which is hung at one end of the axis *a* of the cylinder B. The opposite end of the rod I is bent upward and passes through a slotted plate, K, attached to the end of a shoe, L, which is underneath a hopper, M, said hopper being supported by a frame, N, on the upper part of the box or case A. (See Figs. 1, 2.)

To the rod I is attached a series of teeth or fingers, *e*, (see Figs. 1, 2, and 4,) the teeth or fingers being shown by dotted lines in Fig. 1. The teeth or fingers *e* project downward to a point about on a line with the center of the cylinder, as shown in Figs. 1 and 2.

At one end of the concave C there is an opening, *f*, (see Figs. 1, 2, and 3,) the opening being shown by dotted lines in Fig. 1.

The grain to be ground is placed in the hopper M, and the cylinder B being made to rotate, the grain passes from the shoe L, and through the opening *b*, and then between the cylinder and concave, the shake motion being given the shoe by the reciprocating motion of the rod I, and the reciprocating motion being given to the rod I by the irregular groove *d* in the pulley J. The concave C, it will be seen, extends around about one-third only of the periphery of the cylinder, and the grain is admitted within the cylinder and concave at one end. The grain as it is crushed is carried along to the opposite or discharge end of the concave by the spiral flanges *c*, the flanges being so arranged as to cause the grain to pass over the cylinder and between the grinding-surfaces several times before reaching the discharge end, and in such manner as to render it impossible for the grain to pass twice between any portions of the same grinding-surfaces, thus leaving the passage clear for that which follows, by which means the mill can be fed very fast without clogging. The cylinder and concave are made of sufficient length so that the grain may be passed through a sufficient grinding-surface to reduce it to the desired fineness.

The fingers *e* vibrate or work with a reciprocating motion at the discharge end of the concave opposite the opening *f*, and prevent the ground grain from clogging at that part. With many kinds of grain these fingers would not be required; but in grinding oats they are of importance, and may be equally important in grinding other material. They are not, however, in the way when not really serviceable, and as they are operated through the same devices that operate the shoe are altogether a desirable addition to the mill which is designed for any kind of crushing and grinding which may be required, and applicable to all.

The concave is adjusted to the cylinder so as to grind coarse or fine by operating the nut F on the upper part of the rod E. Although the term "cylinder" is used in the description of the mill, still it may be of a slight taper form, the concave in such case having the same form. By increasing slightly the diameters of the cylinder and concave toward the discharge end it would give a greater grinding-surface with a given length of cylinder than though they were of the same diameter.

This mill has been found in practice to work well, and requires but very little power to drive it. The power of one horse will grind four bushels per hour.

The mill is intended for farmers, and principally for grinding feed, but works equally well for grinding coffee, spices, drugs, &c., and when made of stone works well for grinding flour.

Having thus fully described the nature of my invention, what I claim therein as new, and desire to secure by Letters Patent, is—

1. In combination with the cylinder and concave, the cap H, provided with spiral ribs on its under side for carrying forward the ground material toward the discharge end, and thus to make room for that which follows, and prevent clogging or choking, substantially as described.

2. In combination with the cylinder, concave, and cap, the fingers *e* for agitating the material and causing it to pass more readily in between the cylinder and concave, substantially as described.

AMORY FELTON.

Witnesses:
A. B. STOUGHTON,
THOS. H. UPPERMAN.